United States Patent [19]

Leonelli et al.

[11] Patent Number: 5,523,532
[45] Date of Patent: Jun. 4, 1996

[54] AIRBAG MODULE COVER WITH ATTACHED HORN SWITCH AND METHOD OF PRODUCING SAME

[75] Inventors: F. Paul Leonelli, Ogden; Wael S. Elqadah; Ronald A. Prescaro, both of North Ogden; Tae Y. Kwak, Eden, all of Utah

[73] Assignee: Morton International, Inc., Chicago, Ill.

[21] Appl. No.: 383,972

[22] Filed: Feb. 6, 1995

[51] Int. Cl.⁶ ................................................ H01H 9/00
[52] U.S. Cl. ........................................ 200/61.54; 280/731
[58] Field of Search ................................ 200/5 R, 5 A, 200/61.54–61.57; 280/731

[56] References Cited

U.S. PATENT DOCUMENTS

| | | | |
|---|---|---|---|
| 5,062,661 | 11/1991 | Winget | 280/731 |
| 5,186,490 | 2/1993 | Adams et al. | 280/731 |
| 5,283,404 | 2/1994 | Prescaro, Jr. | 200/61.54 |
| 5,369,232 | 11/1994 | Leonelli | 200/61.54 |
| 5,399,819 | 3/1995 | Lang et al. | 200/61.54 |
| 5,465,998 | 11/1995 | Davis | 280/731 |

Primary Examiner—Kristine L. Kincaid
Assistant Examiner—Michael A. Friedhofer
Attorney, Agent, or Firm—George W. Rauchfuss, Jr.; Gerald K. White

[57] ABSTRACT

A plurality of spaced pairs of stakes are molded on the back of an airbag module cover. A horn switch assembly which is to be mounted on the back of the airbag module cover has a plurality of spaced pairs of openings along the perimeter thereof which are complementary to and are adapted to receive the spaced pairs of stakes on the cover. Subsequent to the positioning of the pairs of stakes in the complementary pairs of openings, the distal ends of the stake pairs are formed into a unitary bridge by heating. The bridge shaped heat staking thus employed thereby locks the horn switch on the back of the airbag module cover to prevent separation of the switch and cover on the deployment of the airbag and provide a much stronger attachment than standard methods of heat staking.

10 Claims, 3 Drawing Sheets

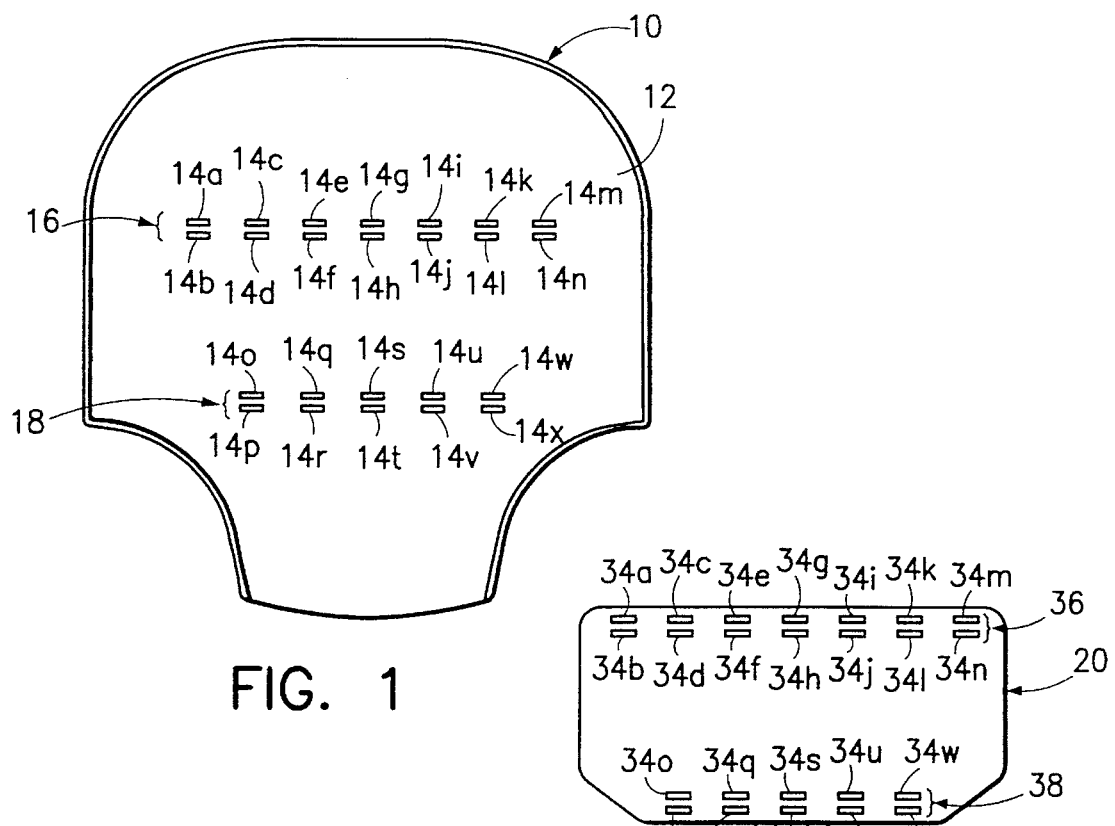
FIG. 1
FIG. 2
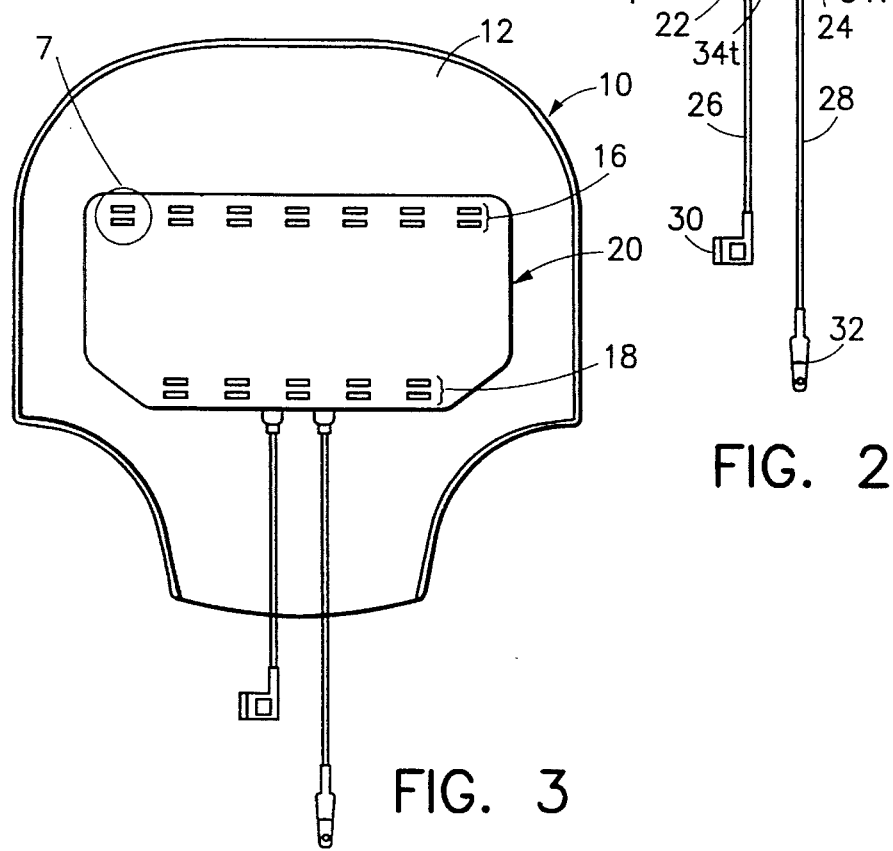
FIG. 3

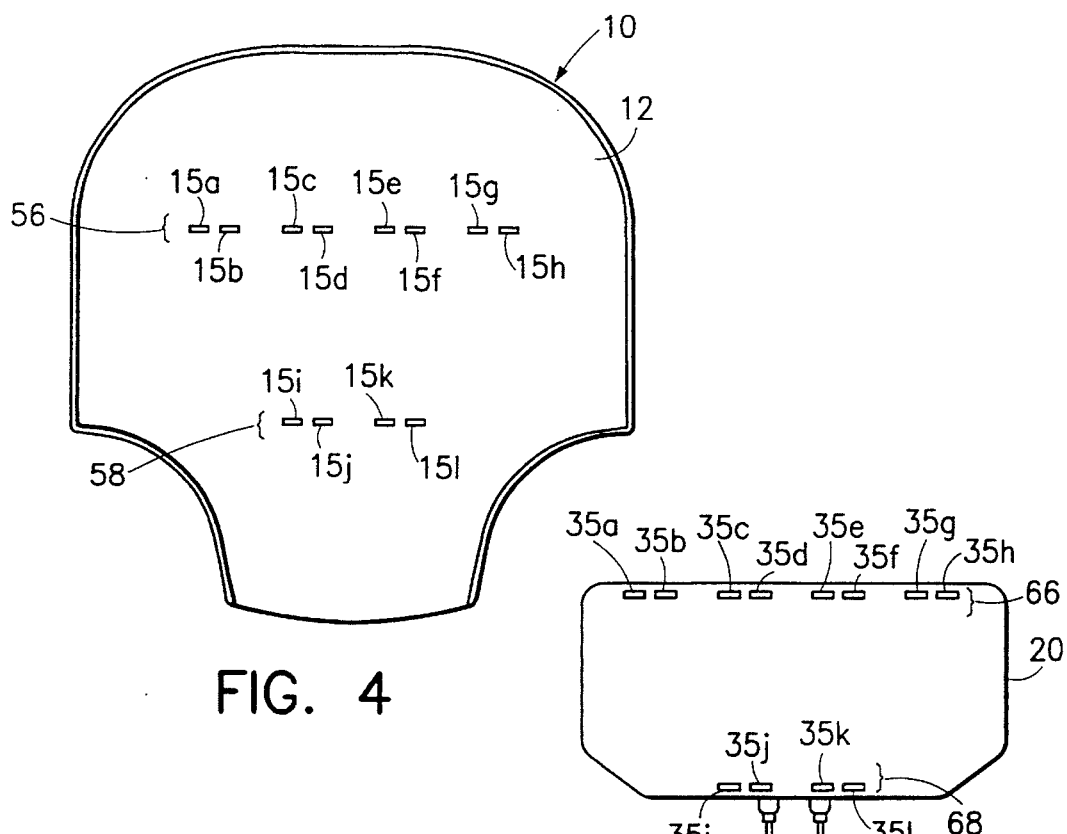
FIG. 4
FIG. 5
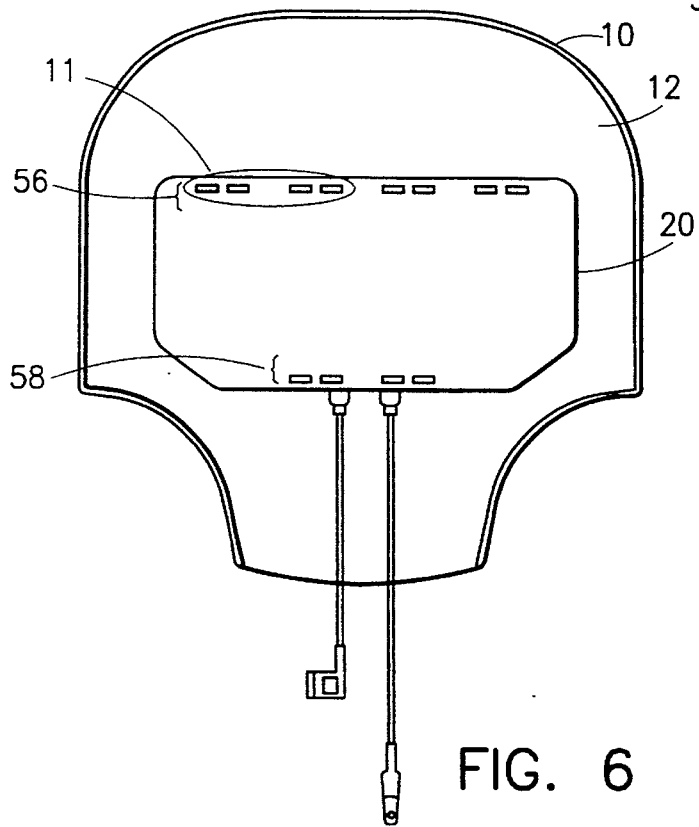
FIG. 6

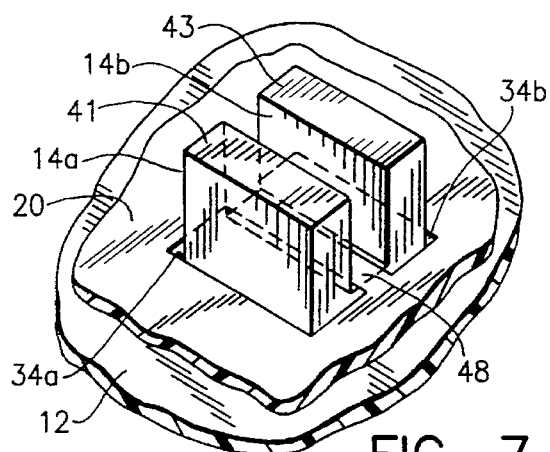
FIG. 7
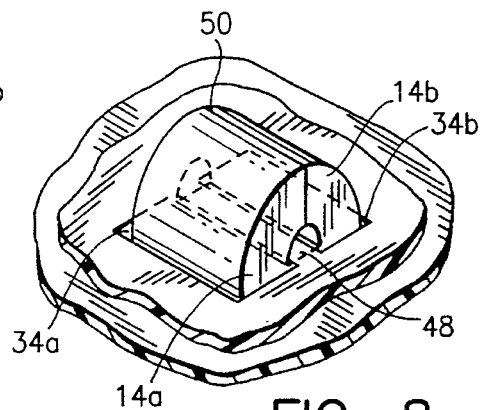
FIG. 8
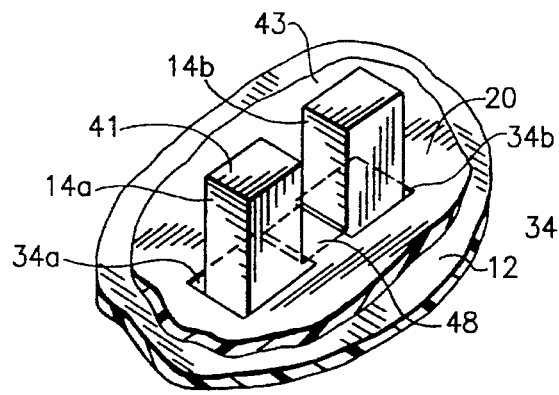
FIG. 9
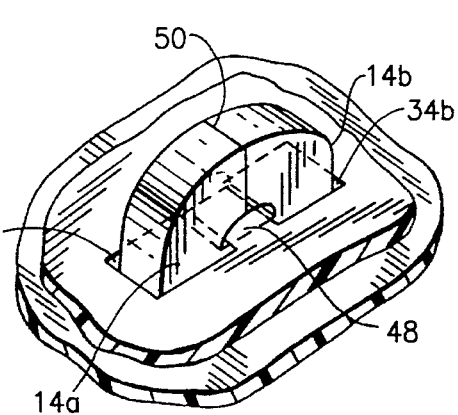
FIG. 10
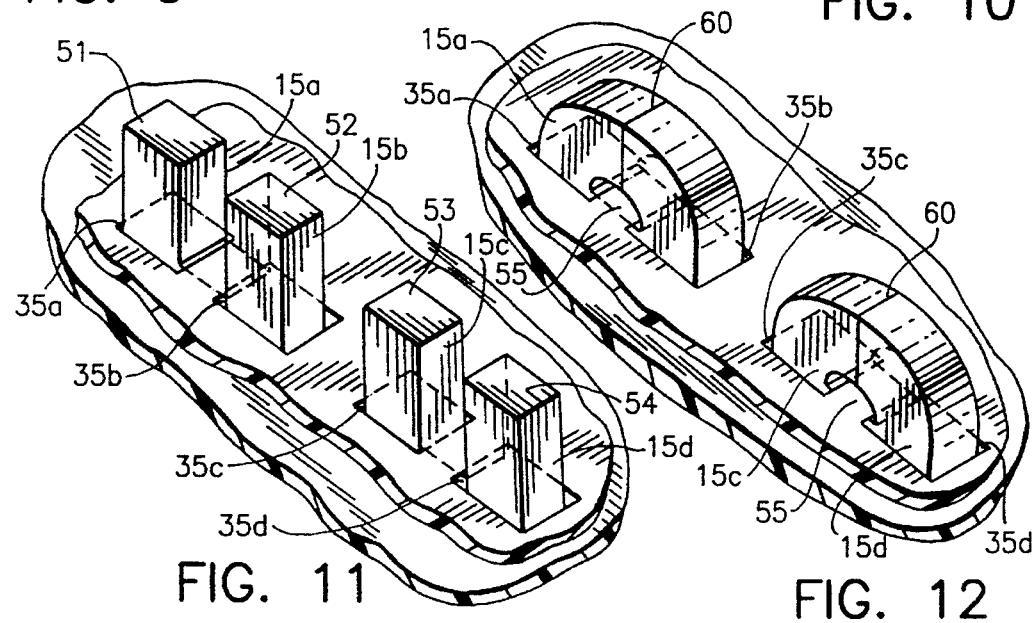
FIG. 11
FIG. 12

AIRBAG MODULE COVER WITH ATTACHED HORN SWITCH AND METHOD OF PRODUCING SAME

FIELD OF THE INVENTION

This invention relates to the mounting of a horn switch, preferably a membrane horn switch, on the back of an airbag module cover, and more particularly, to such a mounting utilizing a bridge heat stake method and to structure for locking the switch on the back of the airbag cover.

BACKGROUND OF THE INVENTION

Driver side airbags are conventionally mounted on steering wheels along with horn blowing switch arrangements. Thin membrane type horn switches provide an advantage in such airbag module assemblies because such a switch can be readily mounted directly on the module cover and actuation of the switch is effected simply by pressing on the module cover rather than by pressing buttons or switches located elsewhere than over the center of the steering wheel. The membrane switch also provides for a conveniently large actuation area.

A problem area with the mounting of membrane switches directly on the airbag module cover is their retention thereon during deployment of the airbag. In U.S. Pat. No. 5,369,232 assigned to the assignee of the present invention, a membrane switch is attached in an illustrative example to the airbag module cover using a standard practice of heat stake retention. This practice involves providing thermoplastic stakes on the rear surface of the module cover which are inserted through complementary openings along the perimeter of a membrane switch assembly. The distal ends of the stakes are heated to form a mushroom type geometry on the end of each stake. Most of the horn switch retention failures experienced with such standard heat staking practice are caused either by the switch slipping over the formed mushroom geometry at the distal end of the stakes or due to the elongation of the stake and switch backing during hot temperature airbag deployment causing the horn switch to separate from the cover as the cover rotates or swivels upon deployment of an airbag or due to the stakes elongating during hot temperature airbag deployment whereby the stakes break in tensile or shear stress.

Accordingly, it is an object of this invention to provide a new and improved method and structure for attaching a horn switch, preferably a membrane horn switch, to a thermoplastic airbag module cover which positively locks the horn switch on the cover and is substantially stronger than standard methods of heat staking a horn switch to the back of an airbag module cover.

SUMMARY OF THE INVENTION

In carrying out this invention in one illustrative embodiment thereof, a method and structure for mounting a membrane horn switch on the back of a thermoplastic airbag module cover comprises the steps of providing, generally by molding, a plurality of spaced pairs of stakes arranged in a predetermined pattern on the rear surface of a thermoplastic airbag module cover with the distal ends of the stakes extending outwardly from the rear surface of the cover. A complementary plurality of spaced pairs of openings arranged in the same predetermined pattern as the plurality of spaced pairs of stakes are provided in the membrane horn switch assembly. The membrane horn switch is mounted on the rear surface of the airbag module cover by positioning the spaced pairs of stakes in the spaced pairs of openings. The distal ends of the spaced pairs of stakes are then connected, forming a plurality of unitary connecting bridges over the membrane horn switch, thereby retaining the membrane horn switch on the rear surface of the airbag module cover. The distal ends of the stake pairs are preferably heated to form the unitary connecting bridges which in effect lock the membrane horn switch on the rear surface of the module cover.

BRIEF DESCRIPTION OF THE DRAWINGS

The invention, together with further aspects, features, objects and advantages thereof, will be more clearly understood from the following description taken in connection with the accompanying drawings.

FIG. 1 is a plan view of the rear surface of an airbag module cover having spaced pairs of stakes formed in adjacent parallel lines of such stakes;

FIG. 2 is a top plan view of a membrane horn switch which is adapted to be mounted on the rear surface of the airbag module cover shown in FIG. 1;

FIG. 3 is a plan view of the rear surface of the airbag module cover of FIG. 1 having the membrane horn switch of FIG. 2 mounted thereon;

FIG. 4 is a plan view of the rear surface of an airbag module cover having spaced pairs of stakes formed in a single longitudinal line;

FIG. 5 is a top plan view of a membrane horn switch which is adapted to be mounted on the rear surface of the airbag module cover shown in FIG. 4;

FIG. 6 is a plan view of the rear surface of the airbag module cover of FIG. 4 having the membrane horn switch of FIG. 5 mounted thereon.

FIG. 7 is an enlarged perspective view of the circled portion 7 of the airbag module cover/horn switch assembly of FIG. 3, in order to illustrate the present invention in simplified form;

FIG. 8 is an enlarged perspective view of the circled portion 7 of the airbag module cover/horn switch assembly of FIG. 3 showing the stake pair formed into a bridge in accordance with the present invention;

FIG. 9 is an enlarged perspective view similar to FIG. 7 showing another possible configuration or shape of the stakes of circled portion 7 of FIG. 3;

FIG. 10 is an enlarged perspective view similar to FIG. 8 showing the stake pair of FIG. 9 formed into a bridge in accordance with the present invention;

FIG. 11 is an enlarged perspective view of circled portion 11 of the airbag module cover/horn switch assembly of FIG. 6 in order to illustrate a further embodiment of the present invention; and FIG. 12 is an enlarged perspective view showing the stake pair of FIG. 11 formed into a bridge in accordance with the present invention.

DESCRIPTION OF THE PREFERRED EMBODIMENTS

Referring now to FIG. 1, a thermoplastic airbag module cover indicated generally by reference numeral 10 having a rear surface or back 12 includes a plurality of spaced pairs of thermoplastic stakes 14a and 14b through 14w and 14x which are molded on the back of the airbag module cover. In this embodiment, each pair of stakes comprises adjacent parallel stakes. That is, stakes 14a and 14b comprise a first pair, stakes 14c and 14d comprise a second pair, and so forth. The plurality of spaced parallel pairs of stakes 14a through 14x are arranged in a suitable predetermined pattern, preferably formed in longitudinally opposed, generally parallel upper double lines 16 and lower double lines 18. The particular number of pairs and their spacing and alignment are not considered critical.

A membrane horn switch indicated generally by reference numeral 20, the construction of which is conventional and, for example, one type of which is described in the aforementioned U.S. Pat. No. 5,369,232, includes crimping terminals 22 and 24 having electrical wires 9–6 and 28, respectively, connected thereto. Electrical connections are made to the switch 20 through the wires 26 and 28 through electrical terminals 30 and 32 at the distal ends of the wires 26 and 28, respectively. The membrane horn switch 20 which is to be mounted on the back 12 of the airbag module cover 10 has a plurality of spaced pairs of openings 34a through 34x along the perimeter sides of the membrane horn switch 20 in longitudinally opposed, generally parallel upper perimeter lines 36 and a lower perimeter lines 38, such that the spaced pairs of openings 34a through 34x precisely match and are complementary to the predetermined arrangement of the spaced pairs of stakes 14a through 14x on the back 12 of the airbag module cover Accordingly, the predetermined configuration of the spaced pairs of stakes 14a to 14x on the rear surface 12 of the airbag module coincide with and are complementary to the predetermined array of spaced openings 34a–34x on the perimeter of the membrane horn switch 20. Thus, when membrane switch 20 is placed on the back of airbag module cover 10 the stakes 14a through 14x will protrude through openings 34a through 34x, respectively. The spaced pairs of openings or holes 34a–34x are arranged substantially along opposed perimeter sides of the horn switch in order not to interfere with the operation of the switch. FIG. 3 illustrates the placement of membrane horn switch 20 onto the back of airbag module cover 10.

FIGS. 4, 5, and 6 are views similar to FIGS. 1, 2, and 3, respectively, showing an alternative arrangement of spaced pairs of stakes 15a through 15l on the back surface 12 of airbag module cover 1 and spaced pairs of openings or holes 35a through 35l on the membrane switch 20. In this arrangement each pair of stakes comprises longitudinally adjacent stakes. Similarly each pair of spaced openings or holes comprises longitudinally adjacent holes or openings. That is, stakes 15a and 15l comprise a first stake pair, stakes 15c and 15d comprise a second stake pair, and so forth. Similarly, openings 35a and 35b comprise a first pair of openings, and so forth. The plurality of spaced longitudinally adjacent stakes 15a through 15l and spaced longitudinally adjacent holes or openings 35a through 35l are arranged in a suitable predetermined pattern, single longitudinal upper lines 56 and 66 of spaced pairs and single longitudinal lower lines 58 and 68 of spaced pairs on opposed peripheral edges of the cover back 12 and membrane switch 20, respectively.

FIGS. 7 and 8 illustrate the attachment method of the present invention utilizing a single pair of stakes such as stakes 14a and 14b illustrated in FIG. 7 having distal ends 41 and 43 thereon. The stakes 14a and 14b accommodate the spaced pair of holes 34a and 34b of the membrane switch 20 which comprise openings for receiving the stakes 14a and 14b, respectively. The stake pair 14a and 14b have their distal ends 4b and 43 formed into a bridge 50, as shown in FIG. 8, which locks the area 48 of the membrane switch 20 between the openings 34a and 341 under the bridge 50 for retaining the membrane switch on the back of the airbag module cover be. The bridge 50 is formed utilizing ultrasonic or any other suitable type of generated heat. It should be appreciated that the bridge configuration in FIG. 8 is idealized and the bridge configuration actually formed may be somewhat different in shape, but the unitized bridge concept remains the same, that is, the distal ends of stake pairs are joined to entrap an area 48 of the membrane switch 20 between the complementary openings. It will be appreciated that all of the pairs of stakes are heated and bridged in the manner similar to that shown in FIG. 8. The configuration shown in FIGS. 7 and 8 forms bridges on the back 12 of the airbag module be in lines 16 and 18 which are parallel to each other.

FIGS. 9 and 10 are similar to FIGS. 7 and 8 and illustrate the same bridging concept but with stakes of a different size than the stakes of FIGS. 7 and 8, but otherwise identical.

FIGS. 11 and 12 are similar to FIGS. 7 and 8 with a different configuration of predetermined pattern of stake pairs. In FIG. 11, stakes 15a, 15b, 15c and 15d having distal ends 5b, 52, 53 and 54, respectively are joined to form bridges 60 as shown in FIG. 12 which bridges lock the areas 55 of the horn membrane switch 20 under the bridges 50. When the whole series of bridges is formed in the lines 56 and 58 on the back 12 of the airbag module cover be, the bridges will be formed in series, instead of in parallel, as was illustrated in FIGS. 7 and 8. Whether the bridges so formed are in series or parallel, the same result occurs, namely, the locking of the membrane switch 20 under a plurality of unitary bridges by the unique heat stake bridge arrangement in accordance with the present invention. The series bridge arrangement has an advantage of using a single row of stakes along the perimeter of the switch 20 while the parallel arrangement of bridges provides more strength.

The heat bridge staking arrangement in accordance with the present invention treats the problem of the difficulty of retention of the horn switch on the back of the cover when the airbag module is deployed. In the present invention, the bridge structure provides a positive lock and would require a complete material failure to occur in order for the switch 20 to escape from the back 12 of the cover The retention of the horn switch on the cover depends, at least in part, on the method of thermal staking, as well as on the type of thermoplastic elastomeric material used for the cover, stakes and backing material for supporting the back membrane or plate of the horn switch. However, for any type of material, the bridge staking method in accordance with the–present invention has proven to be far superior to the previously employed single mushroom forming heat staking approach. The parallel double stake bridge configuration illustrated in FIGS. 1 to 3 with a 1 mm. thick backer material for a button horn switch tested inseparable on an Instron machine at a pull–off load reading above 60 lbs., while a mushroom type stake configuration of any type of material fractured under the same test at a pull-off load of under 30 lbs for a SANTOPRENE polypropylene elastomer cover and stakes.

Since other changes and modifications varied to fit particular operating requirements and environments will be apparent to those skilled in the art, this invention is not considered limited to the examples chosen for purposes of illustration, and includes all changes and modifications which do not constitute a departure from the true spirit and scope of this invention as claimed in the following claims and equivalents thereof.

What is claimed is:

1. An airbag module cover having a horn switch fixedly attached to the rear surface of said airbag module cover, comprising:

a thermoplastic airbag module cover having a plurality of spaced pairs of stakes integral with and having distal ends extending outwardly from the rear surface of said cover, said stakes being arranged in predetermined patterns;

a horn switch having a plurality of spaced pairs of openings therethrough arranged in the same predetermined patterns as said plurality of spaced pairs of stakes such that said horn switch is positioned on the rear surface of said cover with said spaced pairs of stakes extending through said spaced pairs of openings; and bridge means unitary with and interconnecting said distal ends of said spaced pairs of stakes for retaining said horn switch on said rear surface of said cover.

2. An airbag module cover according to claim 1 wherein said horn switch is a membrane switch.

3. An airbag module cover according to claim 2 wherein said bridge means are parallel to each other.

4. An airbag module cover according to claim 2 wherein said spaced pairs of stakes are located along at least two essentially parallel peripheral areas of said horn switch.

5. An airbag module cover according to claim 2 wherein said spaced pairs of stakes comprise longitudinally adjacent stakes.

6. The airbag module cover according to claim 2 wherein said bridge means comprise joined distal ends of each of said spaced pairs of stakes.

7. The airbag module cover according to claim 6 wherein said bridge means are in series with each other.

8. A method for mounting and retaining a horn switch on the rear surface of a thermoplastic airbag module cover comprising the steps of:

molding a plurality of spaced pairs of stakes arranged in a predetermined pattern on the rear surface of the airbag module cover with the distal ends of said stakes extending outwardly from said rear surface of said airbag module cover;

providing on said horn switch a plurality of spaced pairs of openings arranged in the same predetermined pattern as said plurality of spaced pairs of stakes;

mounting said horn switch on the rear surface of said airbag module cover by positioning said spaced pairs of openings on complementary spaced pairs of said stakes; and connecting the distal ends of said spaced pairs of stakes forming a plurality of bridges over areas of said horn switch between said spaced pair of openings.

9. The method as claimed in claim 8 wherein the horn switch is a membrane horn switch.

10. The method as claimed in claim 8 wherein the step of connecting the distal ends of said spaced pairs of stakes comprises heating the distal ends to form integral connecting bridges.

* * * * *

UNITED STATES PATENT AND TRADEMARK OFFICE
CERTIFICATE OF CORRECTION

PATENT NO. : 5,523,532
DATED : June 4, 1996
INVENTOR(S) : Leonelli et al.

It is certified that error appears in the above-indentified patent and that said Letters Patent is hereby corrected as shown below:

```
Col. 3, ln. 13, change "9-6" to read -- 26 --.
Col. 3, ln. 26, after "module cover" insert -- 10. --.
Col. 3, ln. 28, after "airbag module" insert -- 10 --.
Col. 3, ln. 32, after "back" insert -- 12 --.
Col. 3, ln. 43, after "module cover", change "1"
                to read -- 10 --.
Col. 3, ln. 48, change "151" to read -- 15b --.
Col. 3, ln. 66, change "4b" to read -- 41 --.
Col. 4, ln.  1, change "341" to read -- 34b --.
Col. 4, ln.  3, change "be" to read -- 10 --.
Col. 4, ln. 14, change "be" to read -- 10 --.
Col. 4, ln. 22, change "5b" to read -- 51 --.
Col. 4, ln. 26, change "be" to read -- 10 --.
Col. 4, ln. 43, after "cover" insert -- 10. --.
Col. 4, ln. 50, change "the-present"
                to read -- the present --.
```

Signed and Sealed this

Eighteenth Day of February, 1997

Attest:

*Attesting Officer*

BRUCE LEHMAN

*Commissioner of Patents and Trademarks*